United States Patent
Vazquez Carames

(10) Patent No.: US 9,723,027 B2
(45) Date of Patent: Aug. 1, 2017

(54) FIREWALL INFORMED BY WEB SERVER SECURITY POLICY IDENTIFYING AUTHORIZED RESOURCES AND HOSTS

(71) Applicant: Dell Software Inc., Round Rock, TX (US)

(72) Inventor: Hugo Vazquez Carames, Barcelona (ES)

(73) Assignee: SonicWall Inc., Santa Clara, CA (US)

( * ) Notice: Subject to any disclaimer, the term of this patent is extended or adjusted under 35 U.S.C. 154(b) by 26 days.

(21) Appl. No.: 14/937,776

(22) Filed: Nov. 10, 2015

(65) Prior Publication Data

US 2017/0134428 A1 May 11, 2017

(51) Int. Cl.
*H04L 29/06* (2006.01)
*H04L 29/08* (2006.01)

(52) U.S. Cl.
CPC .......... *H04L 63/20* (2013.01); *H04L 63/0227* (2013.01); *H04L 63/101* (2013.01); *H04L 63/1416* (2013.01); *H04L 67/02* (2013.01)

(58) Field of Classification Search
CPC . H04L 63/00; H04L 63/0227; H04L 63/0245; H04L 63/10; H04L 63/101; H04L 63/14; H04L 63/1416; H04L 63/1441; H04L 63/1466; H04L 67/02
See application file for complete search history.

(56) References Cited

U.S. PATENT DOCUMENTS

| | | | |
|---|---|---|---|
| 8,320,372 B2 | 11/2012 | Menten | |
| 8,352,998 B1 * | 1/2013 | Kougiouris | H04L 63/20 726/1 |
| 8,578,489 B1 | 11/2013 | Dubrovsky et al. | |
| 8,850,567 B1 * | 9/2014 | Hsieh | H04L 63/1483 726/22 |
| 9,031,937 B2 * | 5/2015 | Guha | G06F 17/30672 707/723 |
| 9,350,750 B1 | 5/2016 | Aval et al. | |
| 9,557,889 B2 | 1/2017 | Raleigh et al. | |

(Continued)

FOREIGN PATENT DOCUMENTS

WO WO 2006/052714 5/2006
WO WO 2006052714 A2 * 5/2006 ......... H04L 63/0281

OTHER PUBLICATIONS

U.S. Appl. No. 14/965,866 Office Action dated May 18, 2017.

*Primary Examiner* — Eric W Shepperd
(74) *Attorney, Agent, or Firm* — Polsinelli LLP

(57) ABSTRACT

A user of a client device that is protected by a firewall may navigate to a website using a particular browser process (e.g., a window/tab of a browser) of the client device, sending a content request toward a web content server in the process. The firewall may intercept the content request, and may also receive information from the client device identifying which browser process initiated the content request. Before passing the content request to the appropriate web content server, the firewall may request and download a security policy from a security policy server. The security policy may notify the firewall which hosts are authorized/ unauthorized for use with a particular domain, and which file types from each of these hosts are authorized/unauthorized for use with the particular domain. The firewall may then filter content related to the identified browser process based on the security policy.

20 Claims, 8 Drawing Sheets

(56) References Cited

U.S. PATENT DOCUMENTS

| | | |
|---|---|---|
| 2005/0108518 A1 | 5/2005 | Pandya |
| 2008/0127349 A1 | 5/2008 | Ormazabal et al. |
| 2009/0316698 A1 | 12/2009 | Menten |
| 2010/0005118 A1 | 1/2010 | Sezer |
| 2011/0035469 A1* | 2/2011 | Smith ................ H04L 61/1511 709/220 |
| 2011/0211586 A1* | 9/2011 | Zhu ................... H04L 65/1043 370/401 |
| 2011/0219426 A1* | 9/2011 | Kim ................... H04L 41/5058 726/1 |
| 2011/0231924 A1 | 9/2011 | Devdhar et al. |
| 2013/0074177 A1 | 3/2013 | Varadhan et al. |
| 2013/0291107 A1 | 10/2013 | Marck et al. |
| 2014/0053239 A1 | 2/2014 | Narayanaswamy |
| 2014/0181972 A1 | 6/2014 | Karta et al. |
| 2014/0258456 A1* | 9/2014 | Lee ....................... H04L 69/22 709/217 |
| 2015/0058916 A1 | 2/2015 | Rostami-Hesarsorkh et al. |
| 2015/0326613 A1* | 11/2015 | Devarajan ............... G06F 21/51 726/1 |
| 2015/0373167 A1 | 12/2015 | Murashov et al. |
| 2016/0182537 A1* | 6/2016 | Tatourian ............ H04L 63/1416 726/23 |
| 2017/0099310 A1 | 4/2017 | Di Pietro et al. |

\* cited by examiner

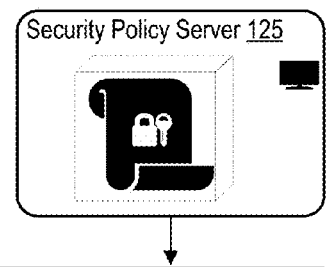
FIG. 2A
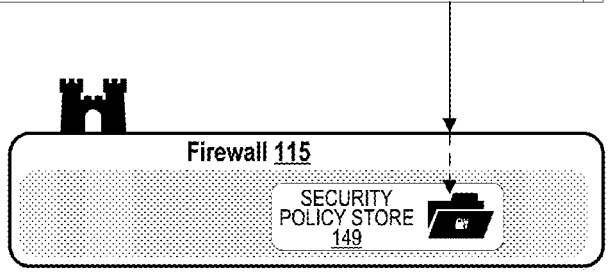

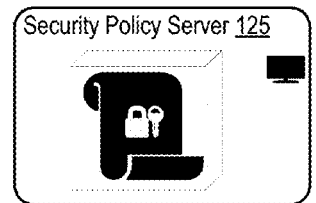
FIG. 2B
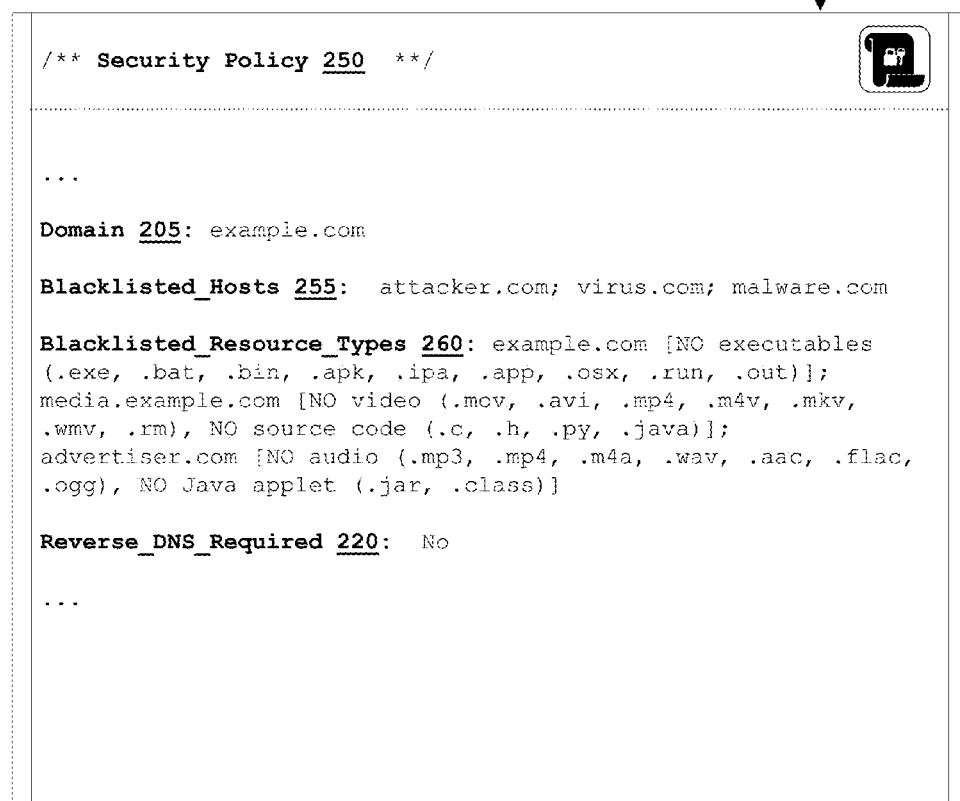
/ Security Policy 250 /
...
Domain 205: example.com
Blacklisted_Hosts 255: attacker.com; virus.com; malware.com
Blacklisted_Resource_Types 260: example.com [NO executables (.exe, .bat, .bin, .apk, .ipa, .app, .osx, .run, .out)]; media.example.com [NO video (.mov, .avi, .mp4, .m4v, .mkv, .wmv, .rm), NO source code (.c, .h, .py, .java)]; advertiser.com [NO audio (.mp3, .mp4, .m4a, .wav, .aac, .flac, .ogg), NO Java applet (.jar, .class)]
Reverse_DNS_Required 220: No
...
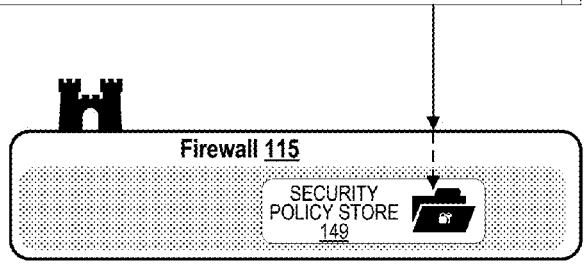

FIREWALL INFORMED BY WEB SERVER SECURITY POLICY IDENTIFYING AUTHORIZED RESOURCES AND HOSTS

BACKGROUND OF THE INVENTION

1. Field of the Invention

The present invention generally relates to network security. More specifically, the present invention relates to a firewall that receives, and is informed by, a security policy that identifies authorized resource sources and content types required by a web server to display a page and blocks anything that is not authorized.

2. Description of the Related Art

Network-based data communications are useful for a variety of tasks, such as sending and receiving emails, browsing Internet webpages, browsing intranet private network portals, sending and receiving instant messages, telephone calls over voice-over-internet-protocol (VOIP) services, and video calls. However, network-based data communications can be dangerous when viruses, adware, spyware, or other kinds of malware are unwittingly transmitted to a user device. Such malware may have been inserted into a web content server by a third party attacker, or may have been injected into a data transmission from the web content server (e.g., via a man-in-the-middle attack) by the third party attacker, or may be sent directly to a client device from the third party attacker.

Typically, firewall systems accept incoming data, filter through the incoming data to identify and block potentially dangerous incoming data, and allow transmission of only data that is safe to transmit. Some firewalls also automatically perform antivirus scans or malware scans of data that the firewall has deemed to be otherwise allowable, which may further be used to block dangerous data in the event that a virus is found.

Virus scanners and malware scanners, while helpful, typically cannot detect all possible viruses or malware. It takes time for virus scanners and malware scanners to be updated to detect new or uncommon viruses or malware, in which time such viruses or malware may pass freely to client systems. Virus scanners and malware scanners may also become compromised by a third-party attacker that has disabled them or crippled them.

Wholesale blacklisting/blocking of certain types of data from being transmitted to a client device (e.g., blocking all executable files, blocking all Java files, blocking all Flash files, blocking all media files) is practiced by some firewalls, and can be effective for certain specialized systems that are only used to perform certain types of tasks that only require receipt of a specific subset of data types (e.g., a server whose only function is to forward text messages). However, such wholesale blocking is problematic in most circumstances, as it may break functionality of certain software applications (e.g. "application store" applications often download executable files) or web pages (e.g., the United States Patent and Trademark Office Private "PAIR" Patent Application Information Retrieval webpage uses a Java applet).

Therefore, there is a need for improved firewall.

SUMMARY OF THE CLAIMED INVENTION

One exemplary method for data filtering includes receiving a first content request from a client device, the first content request having been generated by a first browser process of a browser of the client device, the first content request directed at a first web content server associated with a first domain. The method also includes receiving a process identifier from the client device that identifies the first browser process. The method also includes transmitting a policy request to a security policy server. The method also includes receiving a security policy from the security policy server, the security policy identifying a host filter and a resource type filter associated with the first domain. The method also includes transmitting the first content request to the first web content server. The method also includes receiving a web content dataset from the first web content server. The method also includes transmitting a filtered content dataset to the client device for use by the first browser process, the filtered content dataset including at least a subset of the web content dataset that has been filtered based at least partly on the resource type filter of the security policy. The method also includes preventing the first browser process of the client device from requesting data from one or more requested unauthorized hosts domains, the one or more requested unauthorized host domains identified as being unauthorized to provide data associated with the first domain based at least partly on the host filter of the security policy.

One exemplary system for data filtering includes a communication module for communicating with at least a browser of a client device, a security policy server, and a first web content server associated with a first domain. The system also includes a processor coupled to a memory and also coupled to the communication module. Execution of instructions stored in the memory by the processor performs a variety of system operations. The system operations include receiving a first content request from the client device, the first content request having been generated by a first browser process of the browser of the client device, the first content request directed at the first web content server associated with the first domain. The system operations also include receiving a process identifier from the client device that identifies the first browser process. The system operations also include transmitting a policy request to the security policy server. The system operations also include receiving a security policy from the security policy server, the security policy identifying a host filter and a resource type filter associated with the first domain. The system operations also include transmitting the first content request to the first web content server. The system operations also include receiving a web content dataset from the first web content server. The system operations also include transmitting a filtered content dataset to the client device for use by the first browser process, the filtered content dataset including at least a subset of the web content dataset that has been filtered based at least partly on the resource type filter of the security policy. The system operations also include preventing the first browser process of the client device from requesting data from one or more requested unauthorized hosts domains, the one or more requested unauthorized host domains identified as being unauthorized to provide data associated with the first domain based at least partly on the host filter of the security policy.

One exemplary non-transitory computer-readable storage medium may have embodied thereon a program executable by a processor to perform a method for data filtering. The exemplary program method includes receiving a first content request from a client device, the first content request having been generated by a first browser process of a browser of the client device, the first content request directed at a first web content server associated with a first domain. The program method also includes receiving a process identifier from the client device that identifies the first browser process. The program method also includes transmitting a policy request to a security policy server. The program method also includes receiving a security policy from the security policy server, the security policy identifying a host filter and a resource type filter associated with the first domain. The program method also includes transmitting the first content request to the first web content server. The program method also includes receiving a web content dataset from the first web content server. The program method also includes transmitting a filtered content dataset to the client device for use by the first browser process, the filtered content dataset including at least a subset of the web content dataset that has been filtered based at least partly on the resource type filter of the security policy. The program method also includes preventing the first browser process of the client device from requesting data from one or more requested unauthorized hosts domains, the one or more requested unauthorized host domains identified as being unauthorized to provide data associated with the first domain based at least partly on the host filter of the security policy.

BRIEF DESCRIPTION OF THE FIGURES

FIG. 2A illustrates an exemplary whitelist-based security policy provided by the security policy server to the firewall.

FIG. 2B illustrates an exemplary blacklist-based security policy provided by the security policy server to the firewall.

DETAILED DESCRIPTION

A user of a client device that is protected by a firewall may navigate to a website using a particular browser process (e.g., a window/tab of a browser) of the client device, sending a content request toward a web content server in the process. The firewall may intercept the content request, and may also receive information from the client device identifying which browser process initiated the content request. Before passing the content request to the appropriate web content server, the firewall may request and download a security policy from a security policy server. The security policy may notify the firewall which hosts are authorized/unauthorized for use with a particular domain, and which file types from each of these hosts are authorized/unauthorized for use with the particular domain. The firewall may then filter content related to the identified browser process based on the security policy.

Figure 1A:
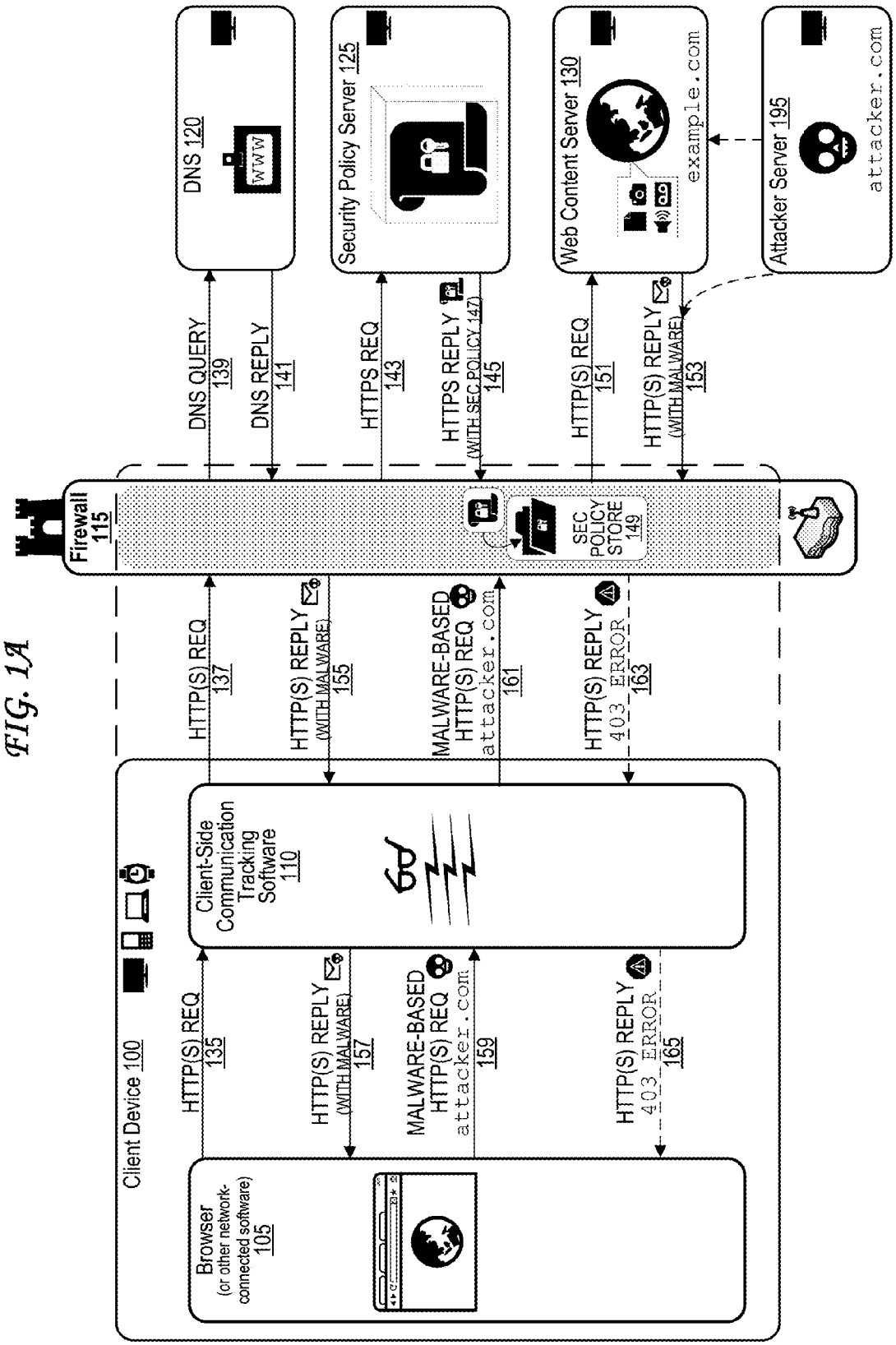
FIG. 1A illustrates an exemplary firewall ecosystem wherein an exemplary firewall blocks a client device from requesting data from an attacker.

FIG. 1A illustrates an exemplary firewall ecosystem wherein an exemplary firewall blocks a client device from requesting data from an attacker.

The exemplary firewall ecosystem of FIG. 1A includes a client device 100, a firewall 115, a domain name server (DNS) 120, a security policy server 125, a web content server 130, and an attacker server 195.

Figure 4:
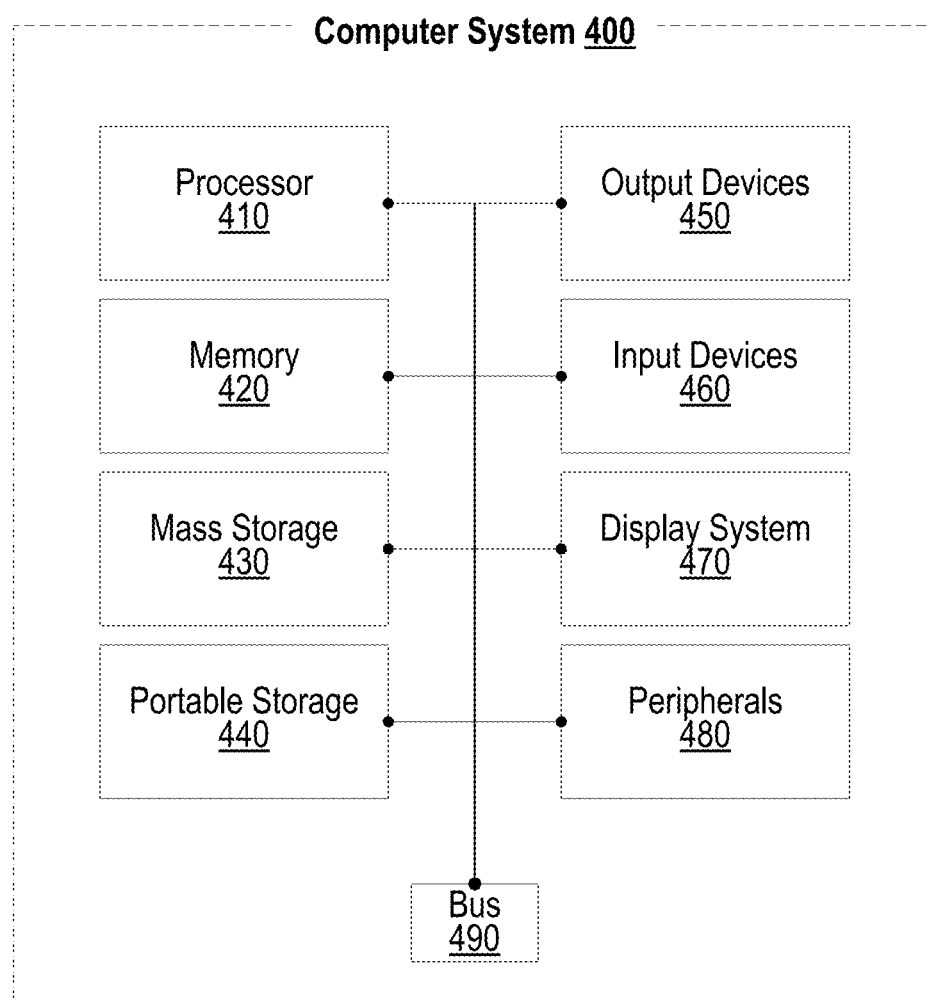
FIG. 4 is a block diagram of an exemplary computing device that may be used to implement an embodiment of the present invention.

The client device 100 may be some variety of computer system 400 or may include at least a subset of the hardware components and software elements identified in FIG. 4. The client device 100 may, for example, include one or more memory and/or data storage module(s) (e.g., which may include any kind of memory 420, mass storage 430, portable storage 440, or some combination thereof), one or more processor(s) (e.g., processor 410), one or more input mechanism(s) (e.g., one or more input devices 460), and one or more display screen(s) (e.g., such as display system 470).

The firewall 115 may include hardware, software, or some combination thereof. For example, the firewall 115 may be located at a network device, wired/wireless router of a private network, such as a local area network (LAN), a wireless local area network (WLAN), a municipal area network (MAN), or a wide area network (WAN). Network devices may also include network servers or network nodes that pass data along a data route. Network devices may also include network controllers (e.g., OpenFlow controllers) or network switches (e.g., OpenFlow switches) if the network is a software-defined network. The firewall 115 may alternately be software-based and executed directly at the client device 100, as indicated by the dashed lines extending from client device 100 in FIG. 1A. The firewall 115 may alternately be some combination of hardware-based and software based, and may be executed by some combination of a network device and the client device 100.

The various servers illustrated in FIG. 1A (including the DNS 120, the Security Policy Server 125, the Web Content Server 130, and the Attacker Server 195) may also each be some variety of computer system 400 or may include at least a subset of the hardware components and software elements identified in FIG. 4. The various servers illustrated in FIG. 1A may each, for example, include one or more memory and/or data storage module(s) (e.g., which may include any kind of memory 420, mass storage 430, portable storage 440, or some combination thereof), one or more processor(s) (e.g., processor 410), one or more input mechanism(s) (e.g., one or more input devices 460), and one or more display screen(s) (e.g., such as display system 470).

The illustrations of FIG. 1A suggest that client device 100 may be a desktop computer, a laptop computer, a mobile telephone device, or a wearable device. The illustrations of FIG. 1A suggest that the various servers illustrated in FIG. 1A (including the DNS 120, the Security Policy Server 125, the Web Content Server 130, and the Attacker Server 195) may be desktop computers. It should be understood that any of these systems may be any type of computing device, including at least those types identified anywhere in this paragraph or in the description of FIG. 4.

The client device 100 may execute various software applications stored in its memory. For example, the client device 100 may execute a browser 105 as illustrated in FIG. 1, which a user of the client device 100 may use to request, display, and interact with network-based content. The browser 105 may be, for example, Google Chrome, Mozilla Firefox, Microsoft Edge, Apple Safari, Microsoft Internet Explorer, Opera, or another browser based at least partially on Webkit, Trident, Gecko, Presto, some combination thereof.

The client device 100 may also execute a client-side communication tracking software 110, which may aid the firewall 115 by matching data requests made by the client device 100 to the software applications (or individual processes) executed by the client device 100 that triggered each of those requests. In the example of FIG. 1A, the client-side communication tracking software 110 may, for example, separately track each window of a browser 105 that allows use of multiple windows, and each tab of a browser 105 that allows use of multiple tabs.

A number of communications are shown in FIG. 1A, illustrated as arrows depicting the direction of the communication. Arrow 135 represents a Hypertext Transfer Protocol (HTTP) Request or HTTP Secure (HTTPS) Request sent from the browser 105, for example, when a user types a destination address (e.g., "example.com" in FIG. 1A) or when a user clicks a hyperlink pointing to the destination address (e.g., "example.com" in FIG. 1A). The request represented by arrow 135 may be an HTTP request or an HTTPS request based on the type of request and the type of content at the web content server 130. For example, web content servers 130 often require use of HTTPS when sensitive content, such as login credentials, credit/debit card information, bank account information, e-payment account information, user locations, emails, social media content, or other personal information is to be transferred. HTTP is typically used when security is less important, such as for regular search engine queries, news articles, and the like.

The HTTP(S) Request of arrow 135 is intercepted by the client-side communication tracking software 110, which identifies the process (e.g., the browser, the browser window, and the browser window tab) that the request originated from. Arrow 137 then represents the client-side communication tracking software 110 allowing the HTTP(S) Request of arrow 135 to go on to the firewall 115 along with the identification of the process making the HTTP(S) request.

Arrow 139 represents a domain name server (DNS) query sent to the domain name server (DNS) 120 from the firewall 115, and arrow 141 represents a DNS reply from the DNS 120 back to the firewall 115. This allows the firewall to obtain an Internet Protocol (IP) address of a web content server 130 corresponding to a given domain name (e.g., an IP address of a web content server 130 corresponding to "example.com" in FIG. 1A). In some cases, the DNS reply represented by arrow 141 may also identify an IP address corresponding to a security policy server 125 related to the web content server 130.

Arrow 143 represents an HTTPS request sent from the firewall 115 to the security policy server 125. Arrow 145 represents an HTTPS reply sent from the security policy server 125 back to the firewall 115. The HTTPS reply represented by arrow 145 includes a security policy 147 that defines what types of resources are authorized for use with the content of the web content server 130, and what sources of content are authorized for use with the content of the web content server 130. The security policy 200 of FIG. 2A and the security policy 250 of FIG. 2B are examples of the security policy 147. Once the firewall 115 receives the security policy 147, it stores it in a security policy store 149, which may be some form of memory or data storage system (e.g., memory 420, mass storage 430, portable storage 440) that is stored either physically at the firewall 115 or at a location that is accessible by the firewall 115 (e.g., a data storage server within a private network guarded by the firewall 115). The security policy store 149 may, in some cases, store multiple security policies 147 corresponding to multiple web content servers 130, and may organize such security policies 147 through the use of a data structure, such as a database, a table, a hash table, an array, an arraylist, a tree, a list, a queue, or some combination thereof.

Arrow 151 represents an HTTP(S) request sent from the firewall 115 to the web content server 130 that is sent requesting the web content initially sought by the HTTP(S) request represented by arrow 135. Arrow 153 represents an HTTP(S) reply sent from the web content server 130 back to the firewall 115. The HTTP(S) reply of arrow 153 may include web content stored at and supplied by the web content server 130, such as markup text/code (e.g., HTML, CSS, PHP, JavaScript), text, photos, videos, audio, flash applications, java applets, ActiveX controls, downloadable files. The HTTP(S) reply of arrow 153 may also identify and include a trigger mechanism to obtain content from other sources of content, such as an advertiser server storing advertisement content, a media server storing images/audio/videos, or in some cases an attacker server 195 storing dangerous content intended to harm or compromise the client device 100. Such a trigger mechanism to obtain content from the attacker server 195 may be referred to as malware, and may take many forms, and may trigger a download of data from the attack server in many ways (e.g., by masquerading as an image or other audiovisual file to be loaded as part of the page, by being triggered by JavaScript or PHP, or some other method of triggering). The HTTP(S) reply of arrow 153 may include such malware if the attacker server 195 has inserted the malware either into the web content server 130 (e.g., so that the malware become embedded in the content that is served by the web content server 130) or into the HTTP(S) reply represented by arrow 153 by compromising (e.g., altering or replacing) the communication before it reaches the firewall 115 (e.g., via a man-in-the-middle attack, packet injection, packet forging, or packet spoofing).

In the exemplary situation of FIG. 1A, the HTTP(S) reply represented by arrow 153 passes through the firewall 115 without detection of the malware (e.g., the trigger mechanism to obtain content from the attacker server 195 may be disguised or otherwise difficult to detect). Arrow 155 and arrow 157 represent the same HTTP(S) reply, with the malware still inside, passing from the firewall 155 to the client-side communication tracking software 110 and back to the browser 105, respectively.

Once the browser 105 receives the HTTP(S) reply represented by arrows 153, 155, and 157, the malware triggers the browser to request content from the attacker server 195 (e.g., "attacker.com" in FIG. 1A). Thus, arrow 159 represents a malware-based HTTP(S) request sent by the browser 159 to the client-side communication tracking software 110, which identifies the browser process requesting this content from the attacker server 195 and sends that information along with the malware-based HTTP(S) request on to the firewall 115 as represented by the arrow 161.

The firewall 115 then uses the process information (from the communication represented by arrow 161) gathered by the client-side communication tracking software 110 to identify the browser process, and locates the corresponding security policy 147. The security policy 147 can identify, among other information, authorized sources of data for the web page served by the web content server 130. This can be represented as a whitelist, as in the listings 210 and 215 of the exemplary security policy 200 of FIG. 2A, or can be represented as a blacklist, as in the listings 255 and 260 of the exemplary security policy 250 of FIG. 2B. Either way, the firewall 115 then identifies that the attacker server 195 is not an authorized source of data for the web page served by web content server 130 by not appearing on a whitelist of the security policy 147, by appearing on a blacklist of the security policy 147, or both.

Once the firewall 115 realizes that it should not be obtaining content from the attacker server 195, it does not do so, and instead either does nothing or transmits an error (e.g., a 403 "access denied/forbidden" error) back through the client-side communication tracking software 110 and to the browser 105, as represented by the arrow 163 and the arrow 165, respectively. In this way, the firewall 115 prevents the client device 100 from receiving data from the attacker server 195.

Figure 1B:
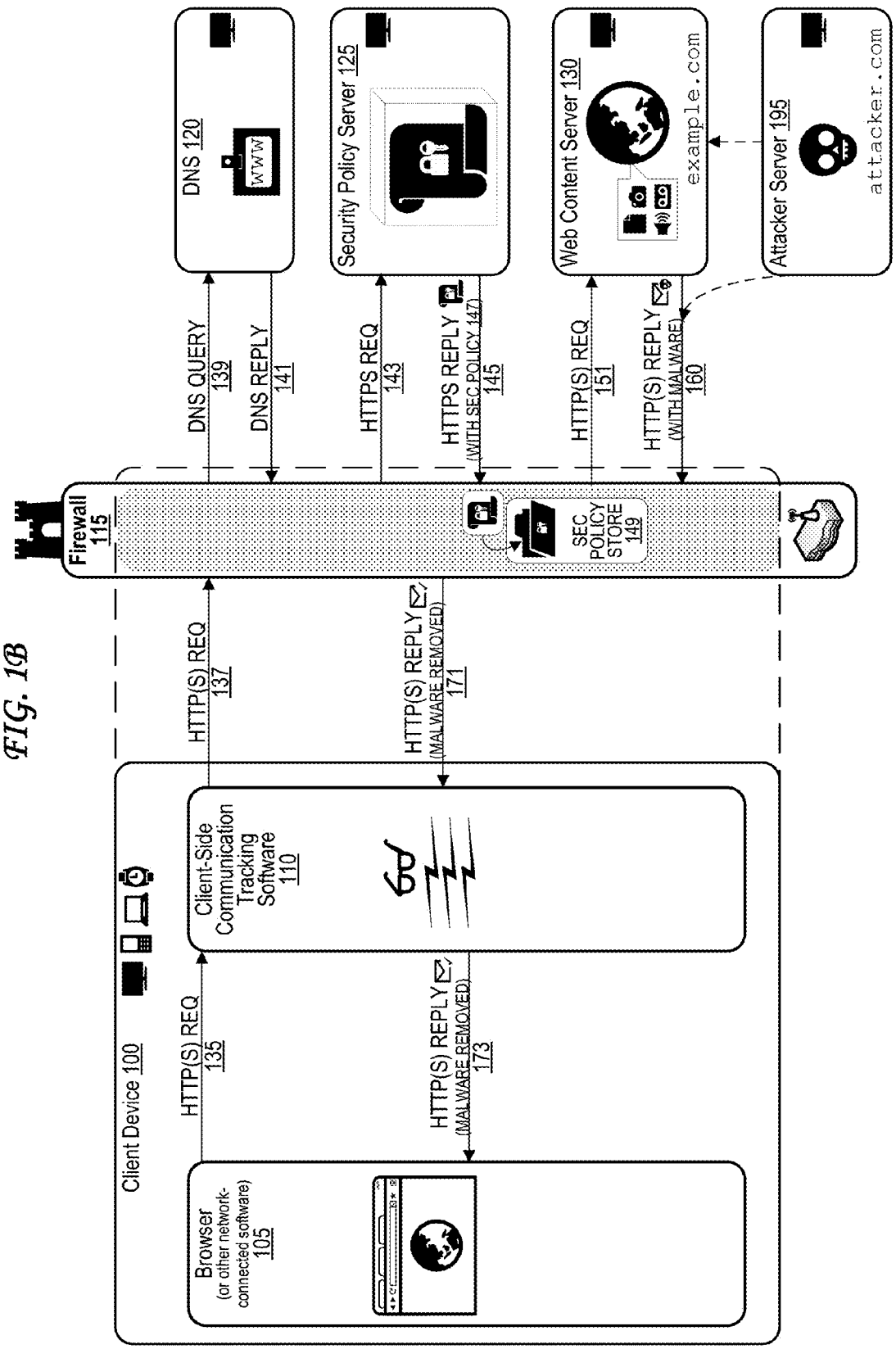
FIG. 1B illustrates an exemplary firewall ecosystem wherein an exemplary firewall detects and removes malware from infected web content.

FIG. 1B illustrates an exemplary firewall ecosystem wherein an exemplary firewall detects and removes malware from infected web content. In particular, FIG. 1B illustrates the exemplary firewall ecosystem of FIG. 1A, but where the firewall 115 is able to detect and remove the malware from the HTTP(S) reply represented by arrow 160.

For example, once the firewall 115 receives the HTTP(S) reply with inserted malware represented by arrow 160, the firewall 115 can parse the markup code (e.g., the HTML as well as any JavaScript or PHP code) to identify a trigger mechanism of the malware, such as by searching for Uniform Resource Locators (URLs), IP addresses, or other identifying strings within the markup code of the HTTP(S) reply of arrow 160. In FIG. 1B, the firewall 115 identifies this malware by detecting its triggering mechanism and strips out at least enough of the malware to stop the client device 100 from trying to later retrieve data from the attacker server 195 upon receipt of the markup code from the firewall 115 (through the client-side communication tracking software 110).

Once the malware has been stripped away from the markup code of the HTTP(S) reply represented by arrow 160, the firewall 115 transmits the stripped version of the HTTP(S) reply with the malware removed back through the client-side communication tracking software 110 and to the browser 105, represented by arrows 171 and 173, respectively.

Figure 1C:
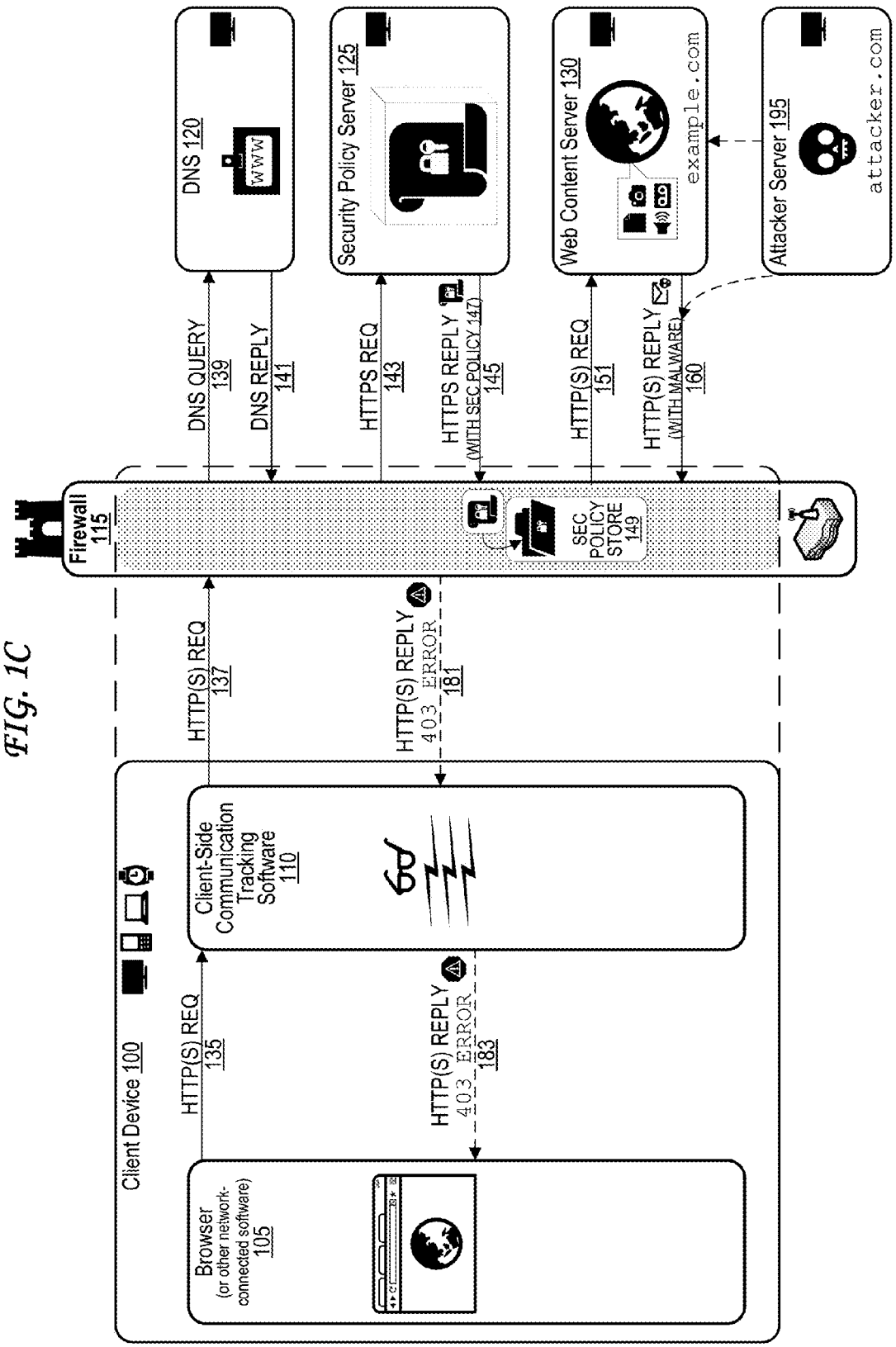
FIG. 1C illustrates an exemplary firewall ecosystem wherein an exemplary firewall detects malware within infected web content and returns an error.

FIG. 1C illustrates an exemplary firewall ecosystem wherein an exemplary firewall detects malware within infected web content and returns an error. In particular, FIG. 1C illustrates the exemplary firewall ecosystem of FIG. 1B, where the firewall 115 is able to detect the malware from the HTTP(S) reply represented by arrow 160.

Once the firewall 115 in FIG. 1C detects the malware in the HTTP(S) reply of arrow 160, however, unlike FIG. 1B, it does not try to strip the malware from the HTTP(S) reply of arrow 160. Instead, it either returns nothing to the browser 105 of the client device 100, or it returns an error message (e.g., a 403 "access denied/forbidden" error) back through the client-side communication tracking software 110 and to the browser 105, as represented by the arrow 181 and the arrow 183, respectively.

In some cases, the firewall 115 of FIG. 1A, FIG. 1B, and FIG. 1C may all be the same firewall. For example, FIG. 1B may represent a situation where malware is detected within the HTTP(S) reply of arrow 160, and is understood to be removable. FIG. 1C may represent a situation where malware is detected within the HTTP(S) reply of arrow 160, and is not well-understood or is understood to be too complicated or dangerous to try to remove. FIG. 1A may represent a situation where malware is hidden in a way that it has not been detected by the firewall 115.

Alternately, the firewalls 115 of FIG. 1A, FIG. 1B, and FIG. 1C may all be the different firewalls that treat malware differently in all cases. For example, the firewalls 115 of FIGS. 1B and 1C may detect malware within the HTTP(S) reply of arrow 160 and have different approaches to it (e.g., remove it or simply return nothing or an error). The firewall 115 of FIG. 1A may in some cases lack malware-detection capabilities, or may detect the malware within the HTTP(S) reply of arrow 160 and decide to ignore it, knowing that it will be able to prevent the client device 100 from later retrieving data from the attacker server 195.

FIG. 2A illustrates an exemplary whitelist-based security policy provided by the security policy server to the firewall. The whitelist-based security policy 200 of FIG. 2A is an example of the security policy 147 illustrated in FIG. 1A, FIG. 1B, and FIG. 1C. The security policy 200 of FIG. 2A includes several field identifying several categories of information.

In particular, the security policy 200 includes a domain field 205, which identifies a domain, or a URL base, of the web content server 130, the domain being visited by a particular browser process of the browser 105.

The security policy 200 also includes an "authorized hosts" field 210, which identifies host domains that are authorized to provide content for the process generating a web page related to the domain identified in the domain field 205. For example, the security policy 200 suggests that content may be provided by source hosts associated with "example.com", "media.example.com", and "advertiser.com."

Any other host (such as the "attacker.com" domain of the attacker server 195) attempting to provide data to a web page related to the domain identified in the domain field 205 (e.g., "example.com") may have its data rejected by firewall 115. The firewall 115 may also prevent the client device 105 for asking for such data from hosts not identified in the "authorized hosts" field 210. The client device may in some cases display or emit a notification that such data has been blocked, and may in some cases give the user the option to let it through anyway. By crafting the security policy 200, then, an owner of the domain identified in domain field 205 can help provide an additional layer of protection to visitors of his/her web page who have a compatible firewall 115 and a client-side communication tracking software 110.

The security policy 200 also includes an "authorized resource types" field 215, which identifies types of data that are authorized to be used with the domain identified in the domain field 205. For example, the security policy 200 suggests that sources associated with "example.com" may provide markup data (e.g., ".html" files, ".css" files, ".xml" files), PHP data (e.g., ".php" files), and JavaScript data (e.g., ".js" files). The security policy 200 also suggests that sources associated with "media.example.com" may provide image data (e.g., ".jpg" files, ".png" files, ".gif" files). The security policy 200 also suggests that sources associated with "media.example.com" may provide markup data (e.g., ".html" files, ".css" files, ".xml" files) and Adobe Macromedia Flash files (e.g., ".swf" files). If any other type of file is attempted (e.g., Any other file types not identified in the "authorized resource types" field 215 may be rejected and blocked by the firewall 115 from reaching the client device 105. Similarly, the firewall 115 may block the client device 105 for requesting file types not identified in the "authorized resource types" field 215. The client device may in some cases display or emit a notification that such data has been blocked, and may in some cases give the user the option to let it through anyway. By crafting the security policy 200, then, an owner of the domain identified in domain field 205 can help provide an additional layer of protection to visitors of his/her web page who have a compatible firewall 115 and a client-side communication tracking software 110.

The security policy 200 also includes a "reverse DNS required" field 220, which identifies whether or not the domain identified in the domain field 205 requires a reverse DNS mapping that provides some identifying information about the client device 105 to the web content server 130. Reverse DNS is sometimes used by analytics platforms or email clients, for example. In some cases, the firewall 115 may be adjusted to also block pages that require a reverse DNS mapping.

FIG. 2B illustrates an exemplary blacklist-based security policy provided by the security policy server to the firewall. The blacklist-based security policy 250 of FIG. 2B is similar to the whitelist-based security policy 200 and includes the same "domain" field 205 and "reverse DNS required" field 220.

Whereas the security policy 200 of FIG. 2A includes an "authorized hosts" field 210 that identifies which host domains are authorized for provide data, the security policy 250 of FIG. 2B instead includes a "blacklisted hosts" field 255 that identifies which host domains are not authorized to provide data. For example, the security policy 250 of FIG. 2B identifies that hosts associated with "attacker.com" (e.g., hosted by attacker server 195), "virus.com," and "malware.com" are not authorized. The firewall 115 may thus block content from the blacklisted hosts identified in the "blacklisted hosts" field 255 when loading a web page associated with the domain identified in the domain field 205 (e.g., "example.com").

The "blacklisted hosts" field 255 of security policy 250 of FIG. 2B is somewhat less secure than the "authorized hosts" field 210 of security policy 200 of FIG. 2A, but is also somewhat more flexible. A disadvantage of the blacklist is that a dangerous host might not be identified in the "blacklisted hosts" field 255 and thus might slip past the firewall 115. An advantage of the blacklist is that a web page can use content from numerous hosts, which may be useful to keep certain types of web pages functioning properly, such as a community-written "wiki" page, a user comments page, or a user-based forum page.

Whereas the security policy 200 of FIG. 2A includes an "authorized resource types" field 215 that identifies which types of data are authorized for use in associated with the domain 205, the security policy 250 of FIG. 2B instead includes a "blacklisted resource types" field 260 that identifies which data types are not authorized to be used in associated with the domain 205. For example, the security policy 250 of FIG. 2B identifies at the "blacklisted resource types" field 260 that data from the host domain "example.com" is not authorized to contain executable files (e.g., ".exe" files, ".bat" files, ".bin" files, ".apk" files, ".ipa" files, ".app" files, ".osx" files, ".run" files, ".out" files) which often have viruses, that data from the host domain "media.example.com" is not authorized to contain video files (".mov" files, ".avi" files, ".mp4" files, ".m4v" files, ".mkv" files, ".wmv" files, ".rm" files) or source code files (".c" files, ".h" files, ".py" files, ".java" files), and that data from the host domain "advertiser.com" is not authorized to contain audio files (".mp3" files, ".mp4" files, ".m4a" files, ".wav" files, ".aac" files, ".flac" files, ".ogg" files) or java applet files (".jar" files, ".class" files).

The "blacklisted resource types" field 260 of security policy 250 of FIG. 2B is somewhat less secure than the "authorized resource types" field 215 of security policy 200 of FIG. 2A, but is also somewhat more flexible. A disadvantage of the blacklist is that a dangerous file type might not be identified in the "blacklisted resource types" field 260 and thus might slip past the firewall 115. An advantage of the blacklist is that a web page can use numerous file types, which may be useful to keep certain types of web pages functioning properly, such as repositories for downloadable software applications (e.g., "app stores", online computer/video game stores) or cloud storage solutions that can store and retrieve numerous types of files (e.g., Dropbox, Google Drive, Box, OneDrive, iCloud).

Some security policies (not shown) may have a mix of whitelists and blacklists. For example, a hypothetical security policy may include an "authorized hosts" field 210 (as in the security policy 200 of FIG. 2A) and a "blacklisted resource types" field 260 (as in the security policy 250 of FIG. 2B). Alternately, another hypothetical security policy may include a "blacklisted hosts" field 255 (as in the security policy 250 of FIG. 2B) and an "authorized resource types" field 215 (as in the security policy 200 of FIG. 2A).

Figure 3A:
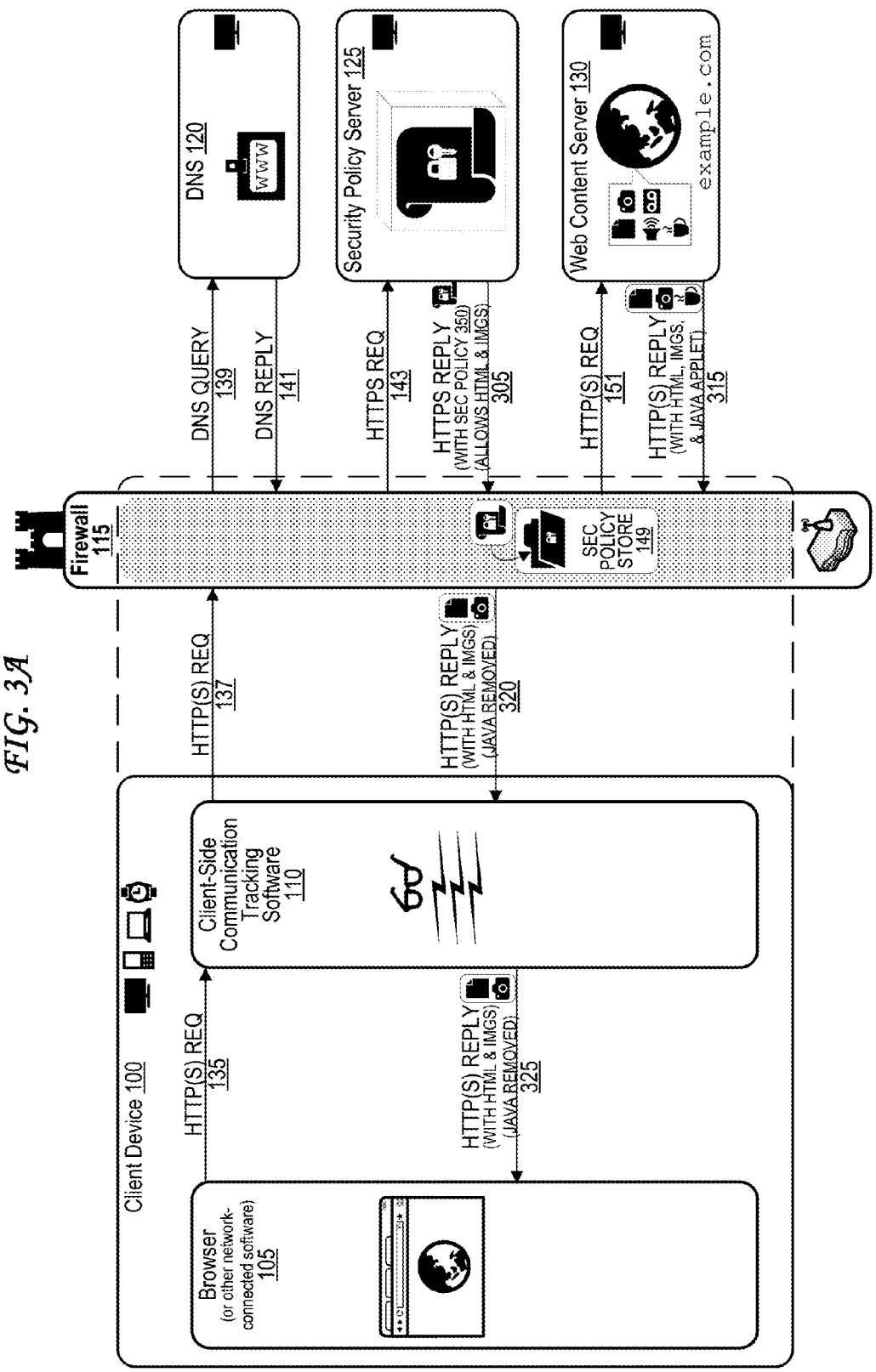
FIG. 3A illustrates an exemplary firewall ecosystem wherein an exemplary firewall detects and removes an unauthorized content type.

FIG. 3A illustrates an exemplary firewall ecosystem wherein an exemplary firewall detects and removes an unauthorized content type.

The firewall ecosystem of FIG. 3A is similar structurally to the firewall ecosystems illustrated in FIG. 1A, FIG. 1B, and FIG. 1C, and includes the same set of communications up until the HTTPS Request represented by arrow 143. The HTTPS reply represented by arrow 305, however, includes a particular security policy 350 (which is an example of a security policy 147) that allows only HTML and image content types (e.g., via a whitelist-based "authorized resource types" field 215). This security policy 350 is stored in the security policy store 149 of the firewall 115.

The firewall 115 then transmits the HTTP(S) request of arrow 151 to the web content server 130 as it would in FIG. 1A, FIG. 1B, or FIG. 1C. The web content server 130 sends back an HTTP(S) reply, represented by arrow 315, which includes HTML content, image content, and Java applet content.

The firewall 115 identifies that the Java applet content received from the web content server 130 as part of the HTTP(S) reply of arrow 315 is not an authorized content type according to the security policy 350 stored in its security policy store 149. Accordingly, in FIG. 3A, the firewall 115 strips out the Java applet content from the HTTP(S) reply and sends the resulting HTTP(S) reply with Java applet content removed back through the client-side communication tracking software 110 and to the browser 105, as represented by the arrow 320 and the arrow 325, respectively. Thus, if the Java applet content was inserted by an attacker, for example, the owner of the web content server 130 can still protect his/her visitors' client devices 100 using the security policy 350.

Figure 3B:
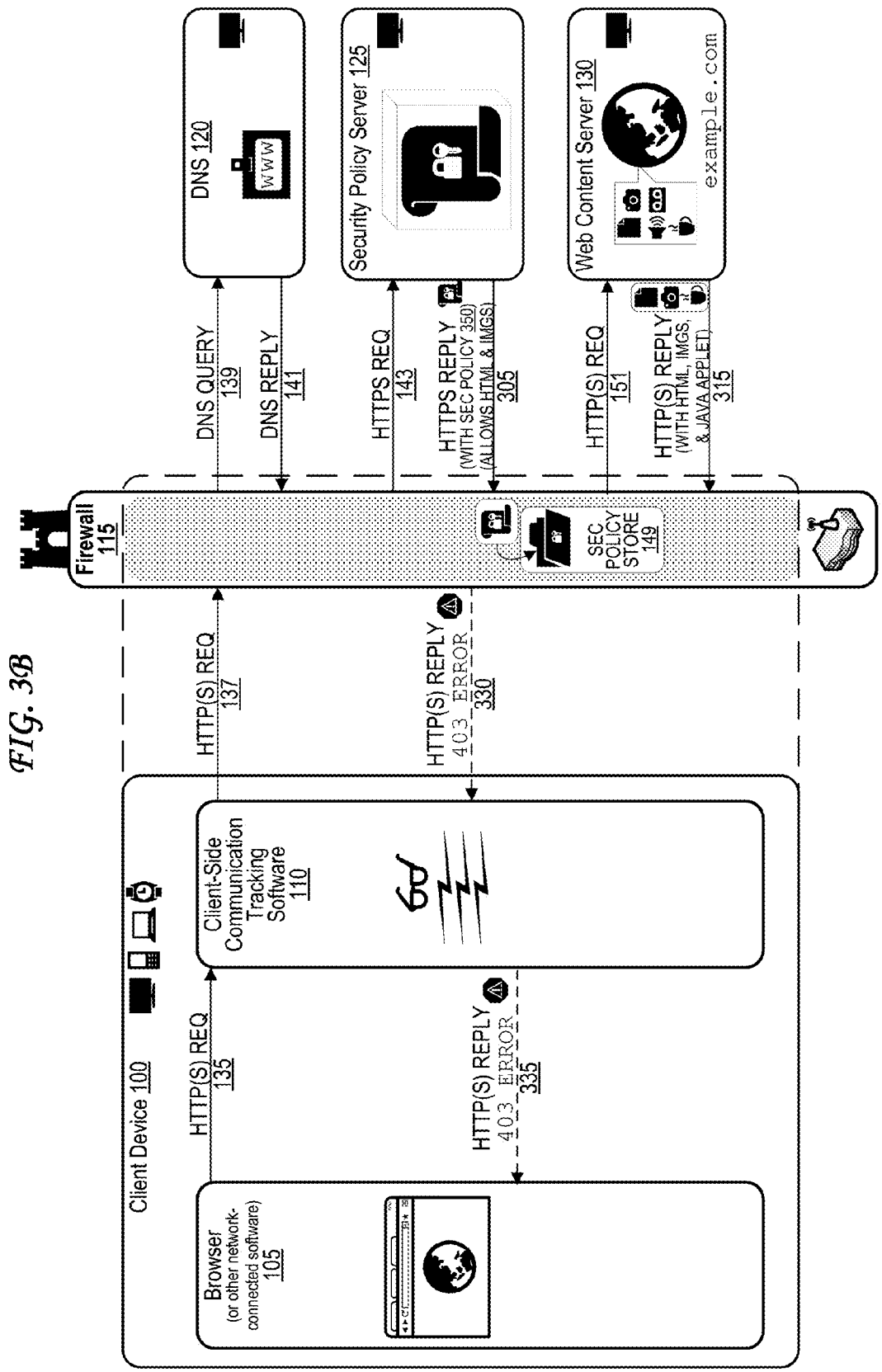
FIG. 3B illustrates an exemplary firewall ecosystem wherein an exemplary firewall detects an unauthorized content type and returns an error.

FIG. 3B illustrates an exemplary firewall ecosystem wherein an exemplary firewall detects an unauthorized content type and returns an error. In particular, FIG. 3B illustrates the exemplary firewall ecosystem of FIG. 3A, where the firewall 115 is able to detect the Java applet content from the HTTP(S) reply represented by arrow 315.

Once the firewall 115 in FIG. 3B detects the Java applet content in the HTTP(S) reply of arrow 315, however, unlike FIG. 3A, it does not try to strip the Java applet content from the HTTP(S) reply of arrow 315. Instead, it either returns nothing to the browser 105 of the client device 100, or it returns an error message (e.g., a 403 "access denied/forbidden" error) back through the client-side communication tracking software 110 and to the browser 105, as represented by the arrow 330 and the arrow 335, respectively.

In some cases, the firewall 115 of FIG. 3A and FIG. 3B may be the same firewall. For example, FIG. 3A may represent a situation where Java applet content is detected within the HTTP(S) reply of arrow 315, and is understood to be removable. FIG. 3B may represent a situation where Java applet content is detected within the HTTP(S) reply of arrow 315, and is not well-understood or is understood to be too complicated or dangerous to try to remove. Alternately, the firewalls 115 of FIG. 3A and FIG. 3B may simply be different firewalls with different approaches to protecting the client device 100 using the security policy 350.

It should also be understood that some of the communications represented by arrows in FIG. 1A, FIG. 1B, FIG. 1C, FIG. 3A, and FIG. 3B may, in some cases, bypass the client-side communication tracking software 110 and pass straight from the firewall 115 to the browser 105 or straight from the browser 105 to the firewall 115.

It should be understood that any and all references to the browser 105 of FIG. 1A, FIG. 1B, FIG. 1C, FIG. 3A, and FIG. 3B may in some cases be replaced by another network-connected software application, such as an e-mail client (e.g., Microsoft Outlook, Mozilla Thunderbird, Apple Mail, iOS Mail), a document-collaboration application (e.g., Microsoft Office, Google Docs), a source-code version control application (e.g., Subversion, Concurrent Versions System), a map application (e.g., Google Maps, Apple Maps, Waze Maps, Microsoft Bing Maps), a file transfer application (e.g. an "FTP" file transfer protocol application), a cloud file storage application (e.g., Dropbox, Google Drive, Box, OneDrive, iCloud), a terminal application, a video streaming application (e.g., Netflix, Hulu, HBO Go, Amazon Prime Video, VideoLan VLC), a music streaming application (e.g., Spotify, Apple Music, Google Play Music, Amazon Prime Music, Pandora, VideoLan VLC Player), a software application repository or store (e.g. Apple iOS App Store, Apple OSX App Store, Valve Steam, Google Play Store, Google Chrome Web Store, Amazon App Store, Microsoft Windows Store, Electronic Arts Origin, GOG Galaxy), a video game application with online multiplayer features, an instant messaging or chat application (e.g., Google Hangouts, Pidgin, Digsby), a voice and/or video call application (e.g., Skype, Google Hangouts, Apple Facetime), an SMS text message application (e.g., Apple iMessage), some combination thereof, or some other network-connected software application.

FIG. 4 illustrates an exemplary computing system 400 that may be used to implement an embodiment of the present invention. The computing system 400 of FIG. 4 includes one or more processors 410 and memory 410. Main memory 410 stores, in part, instructions and data for execution by processor 410. Main memory 410 can store the executable code when in operation. The system 400 of FIG. 4 further includes a mass storage device 430, portable storage medium drive(s) 440, output devices 450, user input devices 460, a graphics display 470, and peripheral devices 480.

The components shown in FIG. 4 are depicted as being connected via a single bus 490. However, the components may be connected through one or more data transport means. For example, processor unit 410 and main memory 410 may be connected via a local microprocessor bus, and the mass storage device 430, peripheral device(s) 480, portable storage device 440, and display system 470 may be connected via one or more input/output (I/O) buses.

Mass storage device 430, which may be implemented with a magnetic disk drive or an optical disk drive, is a non-volatile storage device for storing data and instructions for use by processor unit 410. Mass storage device 430 can store the system software for implementing embodiments of the present invention for purposes of loading that software into main memory 410.

Portable storage device 440 operates in conjunction with a portable non-volatile storage medium, such as a floppy disk, compact disk or Digital video disc, to input and output data and code to and from the computer system 400 of FIG. 4. The system software for implementing embodiments of the present invention may be stored on such a portable medium and input to the computer system 400 via the portable storage device 440.

Input devices 460 provide a portion of a user interface. Input devices 460 may include an alpha-numeric keypad, such as a keyboard, for inputting alpha-numeric and other information, or a pointing device, such as a mouse, a trackball, stylus, or cursor direction keys. Additionally, the system 400 as shown in FIG. 4 includes output devices 450. Examples of suitable output devices include speakers, printers, network interfaces, and monitors.

Display system 470 may include a liquid crystal display (LCD), a plasma display, an organic light-emitting diode (OLED) display, an electronic ink display, a projector-based display, a holographic display, or another suitable display device. Display system 470 receives textual and graphical information, and processes the information for output to the display device. The display system 470 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 480 may include any type of computer support device to add additional functionality to the computer system. For example, peripheral device(s) 480 may include a modem or a router.

The components contained in the computer system 400 of FIG. 4 are those typically found in computer systems that may be suitable for use with embodiments of the present invention and are intended to represent a broad category of such computer components that are well known in the art. Thus, the computer system 400 of FIG. 4 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 400 may in some cases be a virtual computer system executed by another computer system. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for data filtering, the method comprising:
receiving a first content request from a client device, the first content request having been generated by a first browser process of a browser of the client device, the first content request directed at a first web content server associated with a first domain;
receiving a process identifier from the client device that identifies the first browser process;
transmitting a policy request to a security policy server;
receiving a security policy from the security policy server, the security policy identifying a host filter and a resource type filter associated with the first domain;
transmitting the first content request to the first web content server;
receiving a web content dataset from the first web content server;
transmitting a filtered content dataset to the client device for use by the first browser process, the filtered content dataset including at least a subset of the web content dataset that has been filtered based at least partly on the resource type filter of the security policy; and
preventing the first browser process of the client device from acquiring data from one or more requested unauthorized hosts domains, the one or more requested unauthorized host domains identified as being unauthorized to provide data associated with the first domain based at least partly on the host filter of the security policy, wherein the one or more requested unauthorized host domains are requested based on the filtered content dataset.

2. The method of claim 1, wherein the host filter includes a whitelist of authorized host domains, and wherein identifying the one or more requested unauthorized host domains includes identifying that the one or more requested unauthorized host domains do not appear on the whitelist of authorized host domains.

3. The method of claim 1, wherein the host filter includes a blacklist of unauthorized host domains, and wherein identifying the one or more requested unauthorized host domains includes identifying that the one or more requested unauthorized host domains appear on the blacklist of unauthorized host domains.

4. The method of claim 1, wherein the resource type filter includes a whitelist of authorized resource types, and wherein the subset of web content that is transmitted to the client device is identified as conforming to the whitelist of authorized resource types.

5. The method of claim 1, wherein the resource type filter includes a blacklist of unauthorized resource types, and wherein the subset of web content that is transmitted to the client device is identified as not conforming to the blacklist of unauthorized resource types.

6. The method of claim 1, wherein the resource type filter identifies at least one or more file types, the one or more file types including at least one of markup files, JavaScript files, PHP files, Ruby files, image files, audio files, video files, source code files, Flash files, Java applet files, ActiveX files, executable files, text files, document files, presentation files, spreadsheet files, diagram files, project files, or some combination thereof.

7. The method of claim 1, further comprising storing the security policy in a security policy data store of a firewall.

8. The method of claim 1, wherein preventing the identified browser process of the client device from requesting data from one or more requested unauthorized hosts domains includes transmitting an error message to the identified browser process of the client device.

9. The method of claim 1, wherein the web content received from the first web content server has been infected with malware due to insertion of malicious code into at least one of the first web content server or the web content during transmission.

10. The method of claim 9, further comprising detecting malware within the web content received from the web content server.

11. The method of claim 10, further comprising removing the detected malware from the web content received from the web content server, such that the subset of the web content that is transmitted to the client device does not include the malware.

12. The method of claim 1, wherein transmitting at least a subset of the web content to the client device includes transmitting an error message to the client device.

13. The method of claim 1, wherein the first content request is one of a Hypertext Transfer Protocol (HTTP) request or a Hypertext Transfer Protocol Secure (HTTPS) request.

14. The method of claim 1, wherein the policy request is one of a Hypertext Transfer Protocol (HTTP) request or a Hypertext Transfer Protocol Secure (HTTPS) request.

15. A system for data filtering, the system comprising:
a firewall for communicating with at least a browser of a client device, a security policy server, and a first web content server associated with a first domain;
a memory; and
a processor coupled to the memory and also coupled to the firewall, wherein execution of instructions stored in the memory by the processor:
receives a first content request from the client device, the first content request having been generated by a first browser process of the browser of the client device, the first content request directed at the first web content server associated with the first domain;
receives a process identifier from the client device that identifies the first browser process;
transmits a policy request to the security policy server;
receives a security policy from the security policy server, the security policy identifying a host filter and a resource type filter associated with the first domain;
transmits the first content request to the first web content server, receives a web content dataset from the first web content server, transmits a filtered content dataset to the client device for use by the first browser process, the filtered content dataset including at least a subset of the web content dataset that has been filtered based at least partly on the resource type filter of the security policy; and prevents the first browser process of the client device from acquiring data from one or more requested unauthorized hosts domains, the one or more requested unauthorized host domains identified as being unauthorized to provide data associated with the first domain based at least partly on the host filter of the security policy, wherein the one or more requested unauthorized host domains are requested based on the filtered content dataset.

16. The system of claim 15, wherein the memory and the processor are part of the client device.

17. The system of claim 15, wherein the memory and the processor are part of a network device that is communicatively coupled to the client device, wherein the network device is one of a modem, a wired router, a wireless router, a network server, a network node, a network controller, a network switch, or some combination thereof.

18. The system of claim 15, wherein execution of the instructions by the processor further stores the security policy in a security policy data store of the memory.

19. The system of claim 15, wherein the instructions are firewall instructions that are executed via hardware, software, or some combination thereof.

20. A non-transitory computer-readable storage medium, having embodied thereon a program executable by a processor to perform a method for data filtering, the method comprising:

receiving a first content request from a client device, the first content request having been generated by a first browser process of a browser of the client device, the first content request directed at a first web content server associated with a first domain;

receiving a process identifier from the client device that identifies the first browser process;

transmitting a policy request to a security policy server;

receiving a security policy from the security policy server, the security policy identifying a host filter and a resource type filter associated with the first domain;

transmitting the first content request to the first web content server;

receiving a web content dataset from the first web content server;

transmitting a filtered content dataset to the client device for use by the first browser process, the filtered content dataset including at least a subset of the web content dataset that has been filtered based at least partly on the resource type filter of the security policy; and preventing the first browser process of the client device from acquiring data from one or more requested unauthorized hosts domains, the one or more requested unauthorized host domains identified as being unauthorized to provide data associated with the first domain based at least partly on the host filter of the security policy, wherein the one or more requested unauthorized host domains are requested based on the filtered content dataset.

* * * * *